United States Patent

Chennubhotla et al.

[11] Patent Number: 5,841,988
[45] Date of Patent: Nov. 24, 1998

[54] INTERPROCESSOR COMMUNICATIONS DATA TRANSFER AND ERROR DETECTION IN A MULTIPROCESSING ENVIRONMENT

[75] Inventors: Geeta Chennubhotla; Ron E. Hinchley, both of San Jose, Calif.

[73] Assignee: LSI Logic Corporation, Milpitas, Calif.

[21] Appl. No.: 652,421

[22] Filed: May 23, 1996

[51] Int. Cl.[6] .............................. G06F 13/14; G06F 13/48; G06F 13/42
[52] U.S. Cl. ................................ 395/200.67; 395/200.62; 395/290; 395/200.39; 395/308; 395/309; 370/462
[58] Field of Search ...................................... 395/308, 309, 395/200.39, 290, 200.67, 200.62; 711/147; 379/90.01; 370/402; 604/323

[56] References Cited

U.S. PATENT DOCUMENTS

| 4,914,653 | 4/1990 | Bishop et al. | 370/85.6 |
| 5,658,005 | 8/1997 | Garde et al. | 395/800 |

*Primary Examiner*—Frank J. Asta
*Assistant Examiner*—Mark E. Gaski
*Attorney, Agent, or Firm*—Conley, Rose & Tayon, PC; B. Noel Kivlin

[57] ABSTRACT

A multiprocessing system includes a plurality of data processing subsystems each coupled to an interprocessor communications bus through a corresponding interprocessor communications interface. The interprocessor communications interface corresponding to each data processing subsystem includes a receive FIFO buffer unit, a transmit FIFO buffer unit, and a control circuit. When a data processing subsystem desires to transfer data to another processing subsystem, the data processing subsystem packetizes the data in a variable word-length transfer packet which includes a header having a size field and a target field. The data processing subsystem causes the transfer packet to be stored within the transmit FIFO buffer unit. When a valid transmit packet is stored with the transmit FIFO buffer of the interprocessor communications interface corresponding to a particular processing subsystem, the associated control unit requests mastership of the interprocessor communications bus and transmit packet. The interprocessor communications interfaces of the remaining data processing subsystems decode the target information conveyed in the first byte of the transfer cycle. If the target information conveyed during a given transfer cycle corresponds to an assigned target value programmed for a particular interprocessor communications interface, that interprocessor communications interface operates a receiver.

22 Claims, 7 Drawing Sheets

| Word | 31-24 | 23-16 | 15-8 | 7-0 |
|---|---|---|---|---|
| 3 | Byte 14 | Byte 13 | Byte 12 | Byte 11 |
| 2 | Byte 10 | Byte 9 | Byte 8 | Byte 7 |
| 1 | Byte 6 | Byte 5 | Byte 4 | Byte 3 |
| 0 | Byte 2 | Byte 1 | Byte 0 | Size/Target |

FIG. 3

| Signal | I/O | Width |
|---|---|---|
| SB | Inout | 8 |
| SREQ | Out | 1 |
| SGNT | In | 1 |
| SREL | Inout | 1 |
| SFRM | In | 1 |
| SBCLK | In | 1 |

| Word | 31-24 | 23-16 | 15-8 | 7-0 |
|------|-------|-------|------|-----|
| 3 | Byte 14 | Byte 13 | Byte 12 | Byte 11 |
| 2 | Byte 10 | Byte 9 | Byte 8 | Byte 7 |
| 1 | Byte 6 | Byte 5 | Byte 4 | Byte 3 |
| 0 | Byte 2 | Byte 1 | Byte 0 | Target |

| Signal | I/O | Width |
|---|---|---|
| RESET | In | 1 |
| ADR | In | 3 |
| RDI | In | 1 |
| WRI | In | 1 |
| WDB | In | 32 |
| RDB | OUT | 32 |
| RINT | Out | 1 |

INTERPROCESSOR COMMUNICATIONS DATA TRANSFER AND ERROR DETECTION IN A MULTIPROCESSING ENVIRONMENT

1. Field of the Invention

This invention relates to multiprocessing systems and more particularly to interprocessor communications interfaces and data transfer protocols to support interprocessor communications in multiprocessing systems.

2. Description of the Relevant Art

Modern data processing system architectures generally include a plurality of devices interconnected by one or more buses. In addition to general purpose applications, data processing systems are currently being employed to handle a large variety of specific tasks including real time applications such as multimedia. Multimedia applications include video capture and playback, telephony, and speech recognition and synthesis, among others.

To increase performance in systems requiring substantial data processing capabilities, multiple data processing elements are frequently employed. Multiprocessing systems divide tasks into groups that can be handled by separate processing elements, rather than concentrating all the processing for an application in a single processing element. Thus, the processing load is distributed among several of the processing elements. The relatively independent processing elements, each dedicated to a particular task, operate simultaneously and communicate with each other only when necessary.

One system wherein employment of multiple processing elements may be desirable is a "set-top" video decoder requiring the decoding of MPEG (Motion Picture Experts Group) encoded data streams. Since MPEG decoding requires substantial data manipulation and calculation such as DCT (Discrete Cosine Transformation) calculations and quantization, differing processing elements can be employed to simultaneously operate upon different MPEG streams, or to simultaneously operate upon separate dedicated tasks required for the MPEG decoding. By way of the multiprocessing operations, increased overall system performance may be attained.

A management resource or operating system is typically employed within a multiprocessing system to manage the distribution of tasks among the processing elements. Occasionally, the processing elements must communicate between one another to pass data or other control information. For example, the results calculated by one of the processing elements may need to be passed to another processing element for subsequent calculations. In this regard, a significant problem typically associated with multiprocessing systems is the lack of a rigidly defined protocol to expedite the exchange of information between processing elements. Typical interprocessor communication methods require extensive host intervention to set up the receiving device and to effectuate the actual transmission and reception of data and other command information. In addition, typical interprocessor communication protocols require relatively large numbers of protocol control signals which can thus result in increased pin count and overall cost of the systems. Still further, typical interprocessor communication protocols require cumbersome and/or relatively slow acknowledge mechanisms to confirm data transmissions and to indicate communications failures. In some architectures, interprocessor communications can further deleteriously impact the available system bus bandwidth for memory and I/O transactions. This can accordingly cause poor overall system performance.

An interprocessor communications interface and protocol are thus desirable to facilitate the expedient and efficient exchange of information between processing elements in a multiprocessing architecture. It is further desirable to minimize pin-count requirements within such an interface and protocol.

SUMMARY OF THE INVENTION

The problems outlined above are in large part solved by a processing system employing an interprocessor communications interface and method of providing interprocessor communications in accordance with the present invention. In one embodiment, a processing system includes a plurality of data processing subsystems each configured to execute a pre-determined data processing function, such as an arithmetic operation. Each data processing subsystem interfaces to an interprocessor communications bus through a corresponding interprocessor communications interface. The interprocessor communications interface corresponding to each data processing subsystem includes a receive FIFO buffer unit, a transmit FIFO buffer unit, and a control circuit. When a data processing subsystem desires to transfer data to another processing subsystem, the data processing subsystem packetizes the data in a variable wordlength transfer packet which includes a header having a size field and a target field. The size field indicates the size of the packet and the target field indicates the intended receiving processing subsystem to which the transfer packet is directed. The data processing subsystem causes the transfer packet to be stored within the transmit FIFO buffer unit, and sets a bit within a control register of the interprocessor communications interface to indicate that a valid transfer packet is ready for conveyance upon the interprocessor communications bus. The sending data processing subsystem is then free to resume subsequent processing tasks. In one embodiment, each data processing subsystem is coupled to a system memory through a memory bus which is independent of and asynchronous to the interprocessor communications bus.

When a valid transmit packet is stored with the transmit FIFO buffer of the interprocessor communications interface corresponding to a particular processing subsystem, the associated control unit within the interprocessor communications interface requests mastership of the interprocessor communications bus. Upon a corresponding grant by a bus arbiter of the interprocessor communications bus, the control unit conveys each byte within the transfer packet upon the interprocessor bus during a transfer cycle that occupies several successive cycles of the interprocessor communications bus clock. The interprocessor communications bus employs an arbitration and transfer protocol which accommodates systems with relatively low pin count requirements.

The interprocessor communications interfaces associated with the remaining data processing subsystems decode the target information conveyed in the first byte of the transfer cycle. If the target information conveyed during a given transfer cycle corresponds to an assigned target value programmed for a particular interprocessor communications interface, that interprocessor communications interface operates a receiver. Each receiver further decodes the size field of the header byte to determine whether adequate storage is available within its receive FIFO buffer unit. If adequate storage is available, the data conveyed during the subsequent clock cycles of the interprocessor communications bus is stored within the receiver FIFO buffer unit until the total amount of data as indicated by the size field has been received. If adequate room is unavailable within a receiver's FIFO buffer unit, the interprocessor communications interface of that receiver causes the transmitting interprocessor communications interface to abort the cycle. When a particular transfer cycle is aborted, the transmitting interprocessor communications interface will retry the transfer cycle at a later time, without requiring host intervention.

A multiprocessing system employing the interprocessor communications interfaces and data transfer protocols of the present invention advantageously facilitates the expedient and efficient exchange of information between processing elements. Overall pin count requirements may be reduced, thereby reducing cost. Extensive host intervention is not required to set up the receiving device and to effectuate the actual transmission and reception of data and other command information. Deleterious effects upon system bus bandwidth as a result of interprocessor communications may further be reduced.

Broadly speaking, the present invention contemplates a method of supporting interprocessor communications in a multiprocessing system comprising a first processing subsystem generating a transfer packet including a target value, a size value, and data information, storing the transfer packet in a first buffer unit of a first interprocessor communications interface, and conveying the transfer packet from the first buffer unit upon an interprocessor communications bus. The method also comprises receiving from the interprocessor communications bus the transfer packet within a second buffer unit of a second interprocessor communications interface, and providing the data information to a second processing subsystem.

The invention further contemplates a multiprocessing system comprising a first data processing subsystem configured to execute a first data processing function, an interprocessor communications bus, a second data processing subsystem configured to execute a second data processing function coupled to receive data from the interprocessor communications bus, and a first interprocessor communications interface coupled between the first data processing subsystem and the interprocessor communications bus. The interprocessor communications interface is configured to receive a transfer packet from the first data processing subsystem and to convey the transfer packet upon the interprocessor communications bus. The transfer packet includes a target field, a size field, and data information to be conveyed to the second data processing subsystem. The target field contains a target value indicative of an address of the second processing subsystem and the size field contains a value indicative of a total number of bytes included within the transfer packet.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 1:
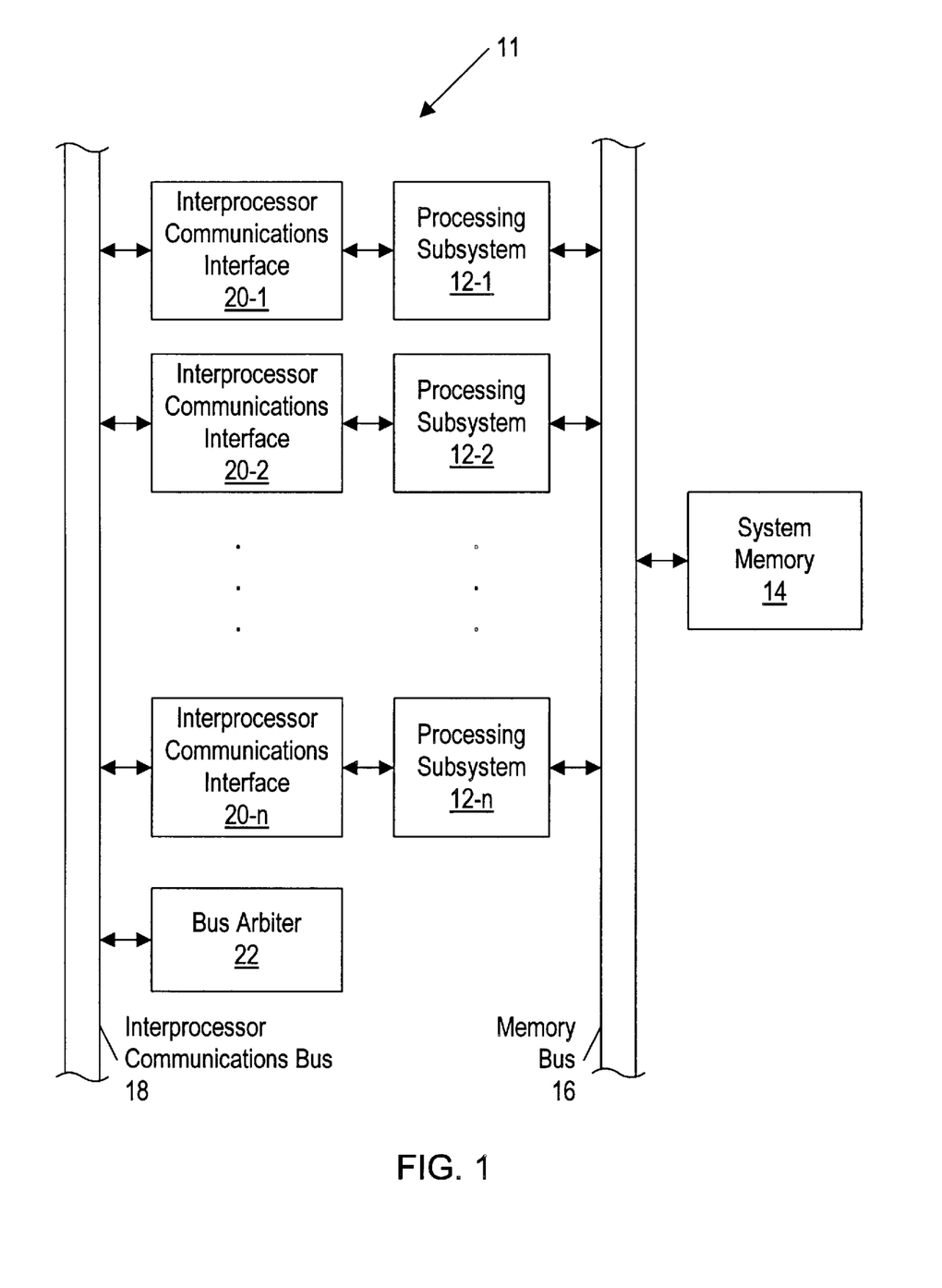
FIG. 1 is a block diagram of a multiprocessing system including an interprocessor communications bus and interprocessor communications interfaces in accordance with the present invention.

Turning now to the drawings, FIG. 1 is a block diagram of a multiprocessing system 10 in accordance with one embodiment of the present invention. Multiprocessing system 10 includes a plurality of processing subsystems 12-1 through 12-N (referred to collectively as processing subsystems 12) coupled to a system memory 14 through a memory bus 16. Each processing subsystem 12 is further coupled to an interprocessor communications bus 18 through a respective interprocessor communications interface 20-1 through 20-N (referred to collectively as interprocessor communications interfaces 20). A bus arbiter is finally shown coupled to interprocessor communications bus 18.

The data processing system 10 may be configured to perform any of a variety of data processing tasks. For example, in one embodiment data processing system 10 is configured to decode a plurality of MPEG encoded video bit streams and to support other video functionality. As will be described further below, in one embodiment each processing subsystem 12 processes instruction code out of system memory 14. Each processing subsystem 12 may further include local memory for code and/or data storage.

Generally speaking, the interprocessor communications interface 20 corresponding to each processing subsystem 12 accommodates intercommunications with other processing subsystems. The interprocessor communications interface 20 of a given processing subsystem 12 is configured to send or receive information formatted in packets that are directed to or from the interprocessor communications interface of any of the other processing subsystem or subsystems through interprocessor communications bus 18. Bus arbiter 22 arbitrates the ownership of interprocessor communications bus 18 among the interprocessor communications interfaces 20.

Figure 2:
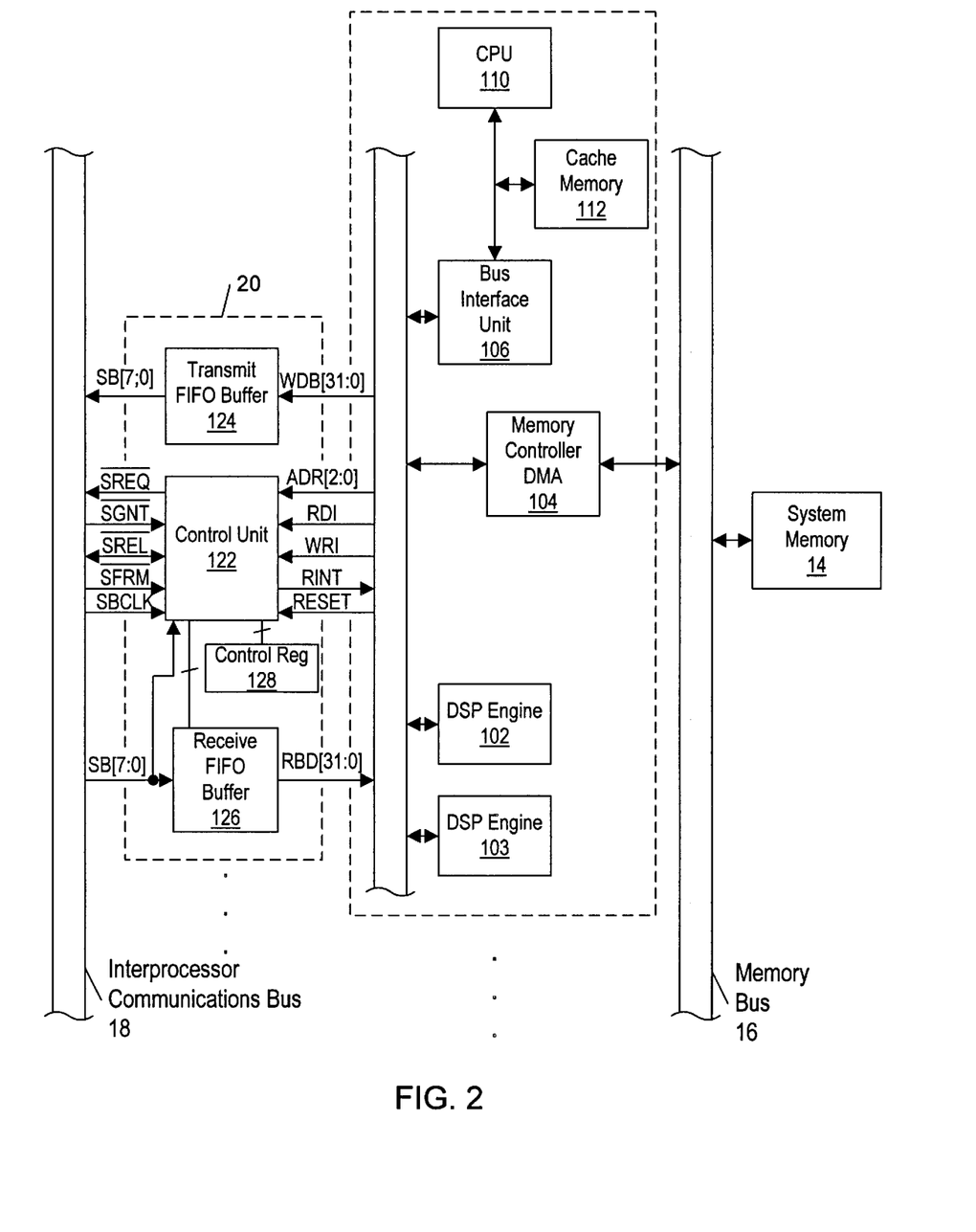
FIG. 2 is a block diagram that illustrates details regarding internal portions of one embodiment of an exemplary processing subsystem and interprocessor communications interface.

FIG. 2 is a block diagram that illustrates details regarding internal portions of one embodiment of an exemplary processing subsystem 12 and interprocessor communications interface 20. Circuit portions that correspond to those of FIG. 1 are numbered identically for simplicity and clarity.

For the embodiment of FIG. 2, processing subsystem 12 includes DSP engines 102 and 103 coupled to a memory controller/DMA 104 and to a bus interface unit 106 through a local bus 108. Bus interface unit 106 is further coupled internally to a CPU 110 and to a cache memory 112. Memory controller/DMA 104 is coupled to memory bus 16.

DSP engines 102 and 103 are digital signal processors configured to perform any of a variety of signal processing tasks, such as MPEG decoding, motion estimation, and others. It is contemplated that other DSP engines configured to perform other processing tasks may be additionally or alternatively employed. It is further noted that the data processing subsystem 12 may be configured in a variety of alternative specific arrangements, and may be configured to perform other tasks desired for the multiprocessing system 10.

Memory controller/DMA 104 controls the transfer of data between local bus 108 and system memory 14. Memory controller/DMA 104 may further accommodate direct memory accesses.

CPU 110 is provided to control and manage processing tasks performed by data processing subsystem 12. CPU 110 executes code out of system memory 14. Cache memory 112 is provided to locally cache code and data accessed by CPU 110.

Data processing subsystem 12 is coupled to interprocessor communications bus 18 through interprocessor communications interface 20. Interprocessor communications interface 20 includes a control unit 122 coupled to a transmit FIFO buffer unit 124, to a receive FIFO buffer unit 126, and to a control registers unit 128. Control signals as shown and described below are employed by interprocessor communications interface 20 to accommodate the transfer of information between data processing subsystem 12 and other data processing subsystems.

Figure 3:
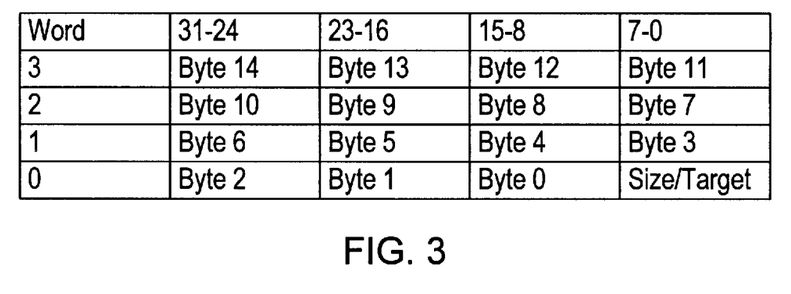
FIG. 3 is a table illustrating the format of a transfer packet stored within a transmit FIFO buffer unit.

When a data processing subsystem 12 desires to transfer data to another processing subsystem, the processing subsystem 12 packetizes the data in a variable word-length transfer packet which includes a header having a size field and a target field. The transfer packet is stored within transmit FIFO buffer unit 124 in a format as illustrated in FIG. 3. The transfer packet is preferably stored by data processing subsystem 12 within transmit FIFO buffer unit 124 one word at a time, wherein each word consists of four eight-bit bytes. A given transfer packet may comprise a total of from one to four words.

As shown in FIG. 3, in one embodiment the format of the transfer packet comprises one to four words. The first byte of the first word comprises two fields: a size field for storing the size of the transfer packet, and a target field for indicating the destination of the transfer packet. The size field indicates the size of the packet and the target field indicates the intended receiving processing subsystem to which the transfer packet is directed. After processing subsystem 12 causes an entire transfer packet to be stored within the transmit FIFO buffer unit 124, processing subsystem 12 sets a transmit control bit (described further below) within control registers unit 128 which causes control unit 122 to responsively begin a transfer cycle upon interprocessor communications bus 18. After setting the transmit control bit within control registers unit 128, processing subsystem 12 is free to resume other processing tasks.

When a valid transmit packet is stored with the transmit FIFO buffer unit 124 of the interprocessor communications interface 20 corresponding to a particular data processing subsystem 12 and the transmit control bit is set, the associated control unit 122 requests mastership of the interprocessor communications bus 18. Upon a corresponding grant by bus arbiter 22 (FIG. 1), the control unit 122 conveys each byte within the transfer packet upon the interprocessor bus 18 during a transfer cycle that occupies several successive cycles of the interprocessor communications bus clock signal SBCLK.

The interprocessor communications interfaces associated with the remaining data processing subsystems decode the target information conveyed in the first byte of the transfer cycle. If the target information conveyed during the first clock of a particular transfer cycle corresponds to an assigned target value for a given interprocessor communications interface 20, that interprocessor communications interface operates a receiver. Each receiver decodes the size field of the header conveyed by the first byte of the transfer packet to determine whether adequate storage is available within its associated receive FIFO buffer unit 126. If adequate storage is available, the header byte along with the data bytes conveyed during the subsequent clock cycles of the interprocessor communications bus 18 are stored within the receive FIFO buffer unit 126 of the receiver until the total amount of data as indicated by the size field has been received. If adequate room is unavailable within a receiver's FIFO buffer unit 126, the interprocessor communications interface 20 of that receiver causes the transmitting interprocessor communications interface 20 to abort the cycle in a manner as described below. Control unit 122 orchestrates the receipt and transmission of transfer packets between interprocessor communications bus 18 and the associated processing subsystem 12.

A status word, as described below, can be read by the processing subsystem 12 to determine a status of the transmission. If the transmission is not successful, the bus will be released, and the transmission will be retried up to three times. If three attempts to deliver the packet are unsuccessful, the control unit 122 will abort and generate an interrupt that is visible to CPU 110 via the status word. When the host processing subsystem 12 reads the status word, the interrupt is automatically cleared.

Figure 4:
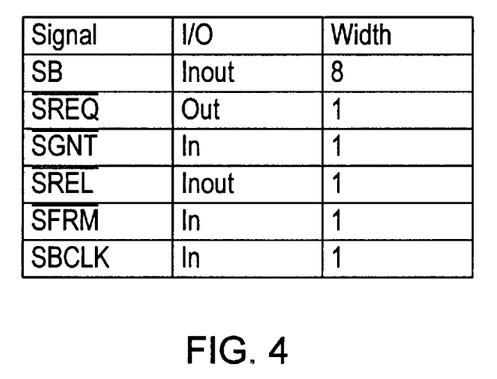
FIG. 4 is a table illustrating interface pins that couple an interprocessor communications interface to an interprocessor communications bus.

FIG. 4 is a table illustrating the interface pins of interprocessor communications interface 20 that couple to interprocessor communications bus 18. As illustrated, a set of data lines SB[7:0] are provided for the transfer of data between transmit FIFO buffer unit 124 and interprocessor communications bus 18, and between receive FIFO buffer unit 126 and interprocessor communications bus 18. Data lines SB[7:0] are further coupled to control unit 122 to allow control unit 122 to snoop the target and size information conveyed upon interprocessor communications bus 18 during a particular transfer cycle. This allows the control unit 122 of each interprocessor communications interface 20 to determine whether it should react as a receiver and to determine whether sufficient room is available within its associated receive FIFO buffer unit 126 to accommodate the transfer cycle.

Control unit 122 generates a signal SREQ to request ownership of interprocessor communications bus 18, and bus arbiter 22 (illustrated in FIG. 1) asserts a grant signal SGNT to indicate a grant of ownership of interprocessor communications bus 18. A separate request signal and a separate grant signal are provided for each interprocessor communications interface 20. Signals SREL and SFRM (referred to as "release" and "frame", respectively) are further illustrated and, as will be described further below, are used to delineate transfer cycles effectuated upon interprocessor communications bus 18. A clock signal SBCLK is finally shown coupled to interprocessor communications bus 18. It is noted that the data bus SB[7:0] may have other bit-widths, and that the interprocessor communications bus clock SBCLK may be synchronous or asynchronous to any of the processing subsystems 12 provided within multiprocessing system 10.

Figure 5:
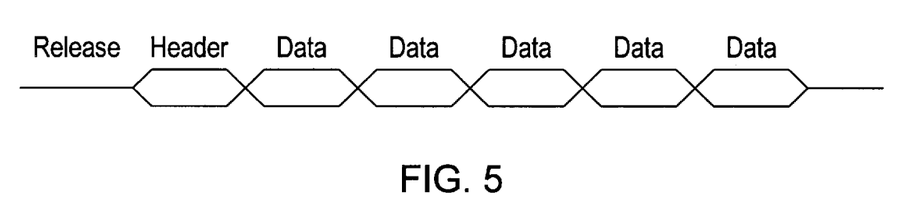
FIG. 5 is a diagram that illustrates an exemplary sequence of bytes conveyed upon data lines of the interprocessor communications bus during the transfer of a packet.

The data bus SB[7:0] is time-multiplexed and is scaleable. FIG. 5 illustrates an exemplary sequence of bytes conveyed upon lines SB[7:0] during the transfer of a packet. As illustrated in FIG. 5, lines SB[7:0] convey the header byte including the target and size information upon a first cycle, and subsequently provide data upon immediately following cycles. It is noted that the data path may not necessarily be the same between all processing subsystems, and that any given pair of processing subsystems may have wider or narrower data paths connected therebetween.

As described previously, information to be conveyed to other processing subsystems is transferred in the form of transfer packets assembled within the transmit FIFO buffer unit 124. In one embodiment, a transfer packet includes a header byte including a target field and a size field. The target field selects a destination processing subsystem to which the data is directed. Devices on the interprocessor communications bus 18 decode the target field to determine whether they have been selected to receive the packet. In one embodiment, the target field is five bits wide, and thus supports identification of 32 target devices.

Figure 6:
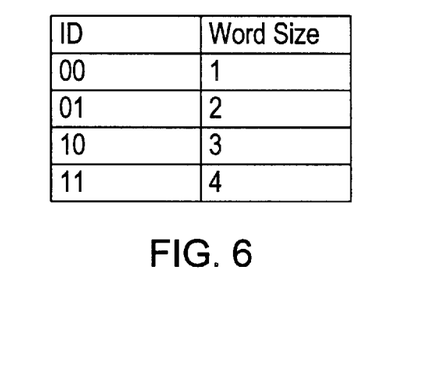
FIG. 6 is a table that illustrates an exemplary encoding of information conveyed by a size field of a transfer packet.

The size field is used by the interprocessor communications interface 20 of a receiving processing subsystem to determine whether there is available room in its receive FIFO buffer unit 126. The size field is further used by the receiving processing subsystem to determine the correct number of words to be removed from the receive FIFO buffer unit 126. FIG. 6 illustrates an exemplary encoding for information conveyed by the size field, wherein a word size is 32 bits. As illustrated, for this implementation, a transfer packet may be formed by either one, two, three, or four words. The size field in this implementation includes two bits.

Referring back to FIG. 5, after conveying the header byte during a transfer cycle for a particular packet, data is transferred upon interprocessor communications bus 18 one byte at a time, until the complete number of bytes totaling that indicated by the size field are conveyed. It is noted that the data fields within a particular transfer packet may be used to convey protocol and/or data information of any nature.

Referring back to FIGS. 1 and 2, if a particular interprocessor communications interface 20 contains a transfer packet to be transferred to another interprocessor communications interface, the interprocessor communications interface 20 must obtain ownership of interprocessor communications bus 18. For this purpose, bus arbiter 22 is employed to arbitrate contending requests for mastership of communications bus 18 and to grant ownership according to a pre-determined arbitration algorithm. In one embodiment, a fair arbitration scheme is employed, such as a round-robin arbitration algorithm.

Figure 7:
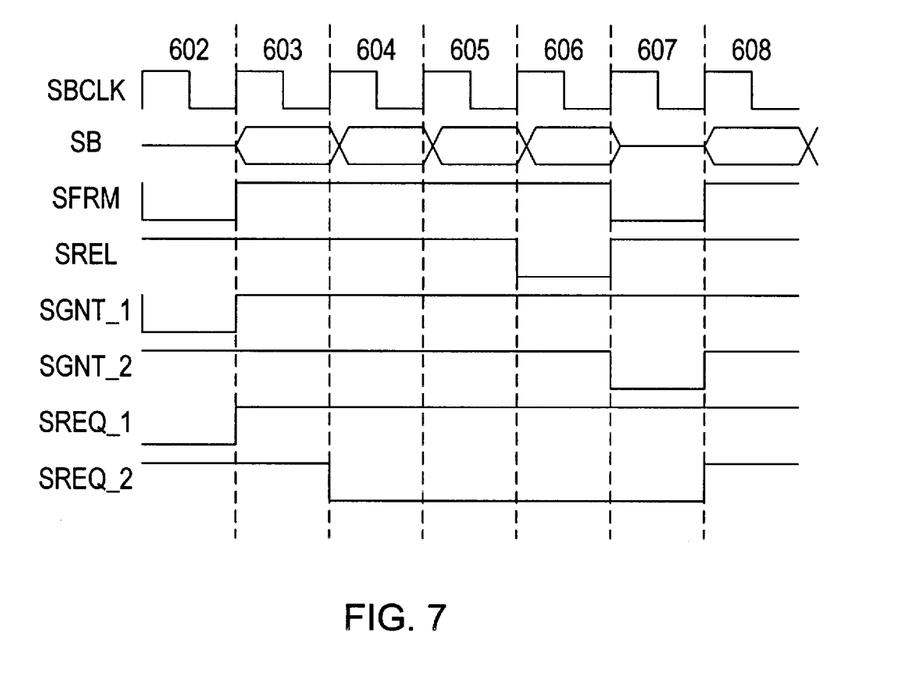
FIG. 7 is a timing diagram that illustrates a exemplary arbitration sequence.

FIG. 7 is a timing diagram that illustrates an exemplary arbitration sequence. For this example, interprocessor communications interface 20-1 (i.e. corresponding the request signal SREQ1 and grant signal SGNT1) is granted ownership of interprocessor communications bus 18 by bus arbiter 22 (shown in FIG. 1) upon a cycle 602 in response to a request indicated by the low assertion of signal SREQ1. The grant is indicated by the low assertion of the grant signal SGNT1. At this point, interprocessor communications interface 20-2 is not requesting the bus, since the request signal SREQ2 is deasserted.

Signals SREL and SFRM delimit transactions effectuated upon interprocessor communicators bus 18. Each interprocessor communications interface 20 tracks these signals in order to parse packet information and to snoop the interprocessor communications bus 18. The SREL signal is asserted by a bus owner one clock prior to releasing the interprocessor communications bus 18. The signal is an open drain type output, but may be actively terminated in high speed buses or terminated with an external resistor for low speed buses. It is noted that the bus grant signals which indicate the grant of ownership of interprocessor communications bus 18 by bus arbiter 22 are always asserted coincident with assertion of the signal SFRM. This allows potential recipients to snoop the target address information conveyed in the first byte of a transfer.

The SREL signal also functions as an abort transmission which forces the initiator to obtain the bus again through arbitration. For the illustrated embodiment, the abort transmission must be asserted upon the second word of a particular transfer cycle. The initiator then terminates the transmission on the next clock. The transmitter's pointers (i.e., transmit FIFO buffer pointers) are restored to the condition prior to the aborted transmission and the bus is released. This can result from insufficient room in the target's receive buffer.

As illustrated in FIG. 7, upon the next cycle 603 of the clock signal SBCLK, the header byte of the transfer packet from interprocessor communications interface 20-1 is conveyed upon interprocessor communications bus 18. Three subsequent bytes that form the data for the transfer packet are conveyed during cycles 604–606. It is noted that upon cycle 604, interprocessor communications interface 20-2 requests ownership of interprocessor communications bus 18. This request will be prioritized and processed by bus arbiter 22 according to the pre-determined arbitration algorithm. It is further noted that upon cycle 606, interprocessor communications interface 20-1 asserts signal SREL to indicate that it will release the bus upon the next clock cycle. In response, for this example bus arbiter 22 grants ownership of the interprocessor communications bus 18 to interprocessor communications interface 20-2 during cycle 607, and simultaneously asserts the frame signal SFRM. Upon bus cycle 608, the header byte corresponding to the transfer packet being conveyed by interprocessor communications interface 20-2 is conveyed upon interprocessor communications bus 18, and associated data is conveyed upon subsequent cycles (not shown).

Figure 8:
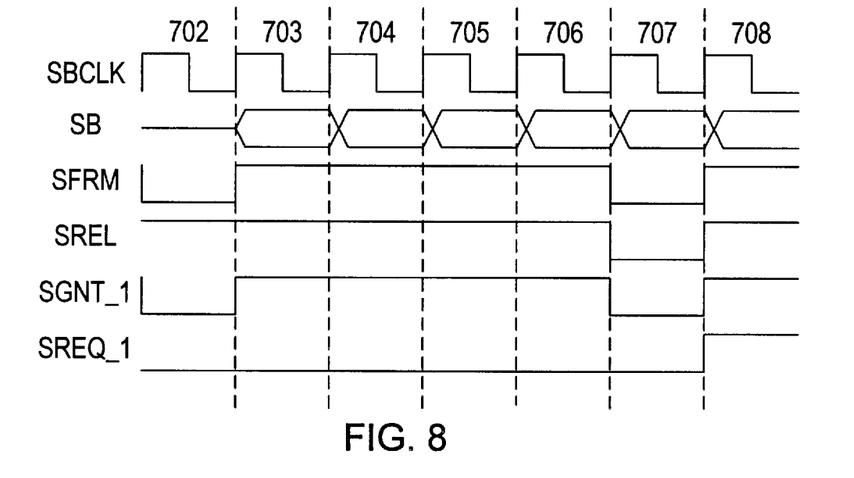
FIG. 8 is a timing diagram that illustrates an interprocessor communications interface requesting ownership of the interprocessor communications bus in succession.

An interprocessor communications interface 20 can request ownership of the interprocessor communications bus 18 in succession to allow for the transfer of multiple transfer packets. FIG. 8 illustrates such a situation. As illustrated in FIG. 8, after the interprocessor communications interface 20-1 is granted the bus during cycle 702, the request signal SREQ1 for that device remains asserted. A first transfer packet is conveyed during cycle 703–707. Since the request signal SREQ1 remains asserted, bus arbiter 22 reasserts the grant signal SGNT1 and the frame signal SFRM upon assertion of the release signal SREL by interprocessor communications interface 20-1 (assuming no other interprocessor communications interfaces are simultaneously requesting ownership of the bus). Interprocessor communications interface 20-1 thereafter commences the transmittal of the second transfer packet during cycle 708, and deasserts the request signal SREQ1. Subsequent bytes within the transfer packet are conveyed during immediately following clock cycles (not shown).

Figure 9:
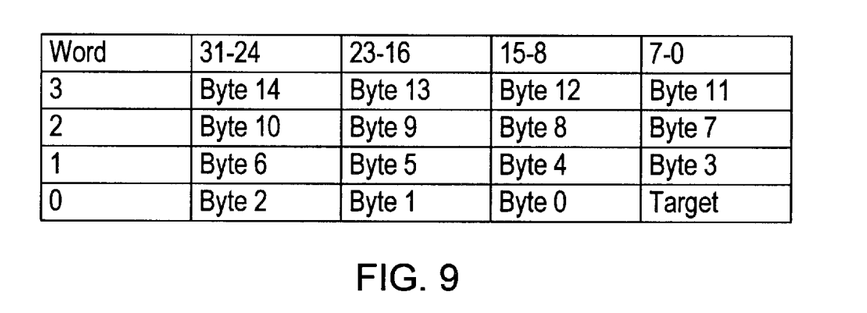
FIG. 9 is a table illustrating the organization of a transfer packet contained by a receive FIFO buffer unit.

FIG. 9 is a conceptualized illustration of the organization of a transfer packet contained by receive FIFO buffer unit 126 following reception from interprocessor communications bus 18. As discussed above, data is received by receive FIFO buffer unit 126 one byte at a time from interprocessor communications bus 18, beginning with the header byte. Data bytes are sequentially stored within the receive FIFO buffer 126 until an amount of data corresponding to the total number of words indicated by the size field of the header are stored within receive FIFO buffer unit 126. As stated previously, the total information contained in a particular transfer packet may comprise one word, two words, three words, or four words. When a transfer cycle is initiated upon interprocessor communications bus 18, control unit 122 decodes the target information contained within the header byte conveyed on SB[7:0] to determine whether it is an intended receiver, and if the data is directed to that particular interprocessor communications interface, control unit 122 latches (i.e., stores) the target byte into receive FIFO buffer unit 126, and latches the remaining bytes forming the transfer packet upon subsequent clock cycles.

Upon the start of a transfer cycle, the control unit 122 of a receiver also detects the size field to determine whether there is adequate room in its receive FIFO buffer unit 126 to hold the packet. If the packet does not fit, the receiver may abort the transmission, forcing the initiator to re-acquire the bus and transmit again at a later time. The manner in which the receiver causes the cycle to be aborted is discussed below. It is noted that the processing subsystem of the transmitting interprocessor communications interface 20 is not required to supervise the abort/retransmission process unless a time out occurs, as is also described below.

Figure 10:
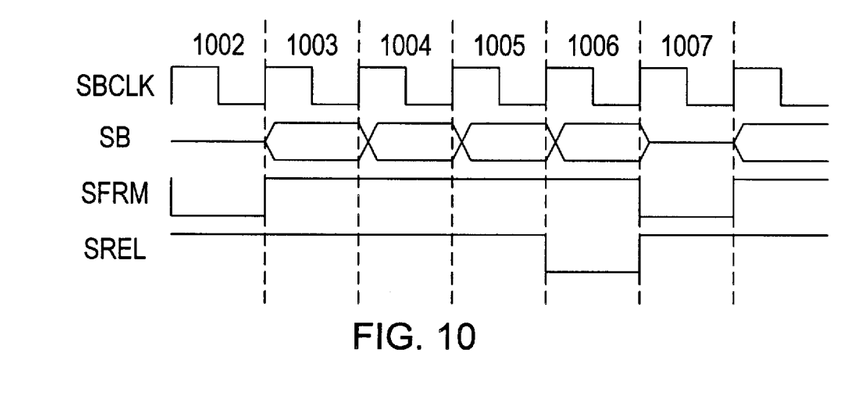
FIG. 10 is a timing diagram that illustrates a typical transfer cycle delimited by a frame signal and a release signal.

FIG. 10 illustrates a typical transfer cycle delimited by the frame signal SFRM and the release signal SREL. For the example of FIG. 10, a transfer packet formed by four bytes is conveyed upon interprocessor communications bus 18. As illustrated, the frame signal SFRM is asserted by bus arbiter 22 upon a cycle 1002, which immediately precedes a clock cycle 1003 during which the header byte of the transfer packet is conveyed upon interprocessor communications bus 18. Data bytes within the transfer packet are conveyed during cycles 1004 through 1006. Upon conveyance of the final byte during cycle 1006, control unit 122 asserts the release signal. Upon clock cycle 1007, bus arbiter 22 grants ownership to another or the same interprocessor communications interface 20 to allow conveyance of another transfer packet.

Figure 11:
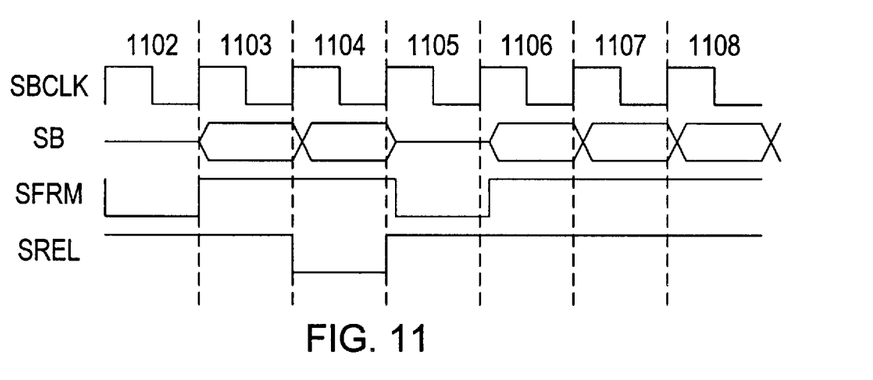
FIG. 11 is a timing diagram that illustrates an exemplary abort transmission.

FIG. 11 is a timing diagram that illustrates an exemplary abort transmission. Upon clock cycle 1102, the frame signal SFRM is asserted to allow commencement of the conveyance of a particular transfer packet beginning with the header byte during clock cycle 1103. Upon clock cycle 1103, the intended recipient decodes the target field of the header to determine that it is the intended recipient of the transfer packet, and determines whether it has available room within its receive FIFO buffer unit 126 to receive the entire transfer packet as indicated by the size field of the header byte. If adequate room is unavailable, the interprocessor communications interface 20 of the receiver asserts the release signal SREL during clock cycle 1104 to abort the cycle. Upon cycle 1105, bus arbiter 22 grants ownership of interprocessor communications bus 18 to allow the conveyance of another transfer packet during cycles 1106–1108.

It is noted that a pending transfer cycle commences upon assertion of the clock signal BCLK and the assertion of a grant signal SGNT. A requester may pipeline requests by leaving its bus request signal SREQ asserted. When a grant is coincident with the release SREL, then the release phase is skipped. When no other requests are pending, the grant will remain with the last device granted, even if no request is present. When a request signal SREQ is asserted, the device must be ready to execute the cycle at the earliest grant time.

Figure 12:
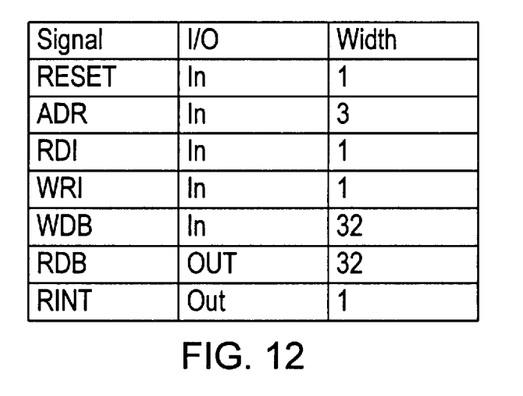
FIG. 12 is a table illustrating signals that interface between an interprocessor communications interface and a local bus.

FIG. 12 is a table illustrating signals that interface between interprocessor communications interface 20 and local bus 108. When data is written into transmit FIFO buffer unit 124 from local bus 108 via data lines WDB[31:0], the valid data is driven on local bus 108 coincident with the assertion of the write strobe WRI and address signal ADR2:0. The decodable address values for accessing interprocessor communications interface 20 are mapped within the addressable space of CPU 110. To read data from receive FIFO buffer unit 126, the read strobe RDI is asserted coincident with the address that is mapped for receive FIFO buffer unit 126. The data is sampled upon the next clock. It is noted that data may be read from receive FIFO buffer 126 and written to transmit FIFO buffer 124 via bus 108 one word at a time. The interrupt signal RINT is a level type interrupt that interrupts the CPU 110 when the interprocessor communication interface 20 requires service, as described below.

Figure 13:
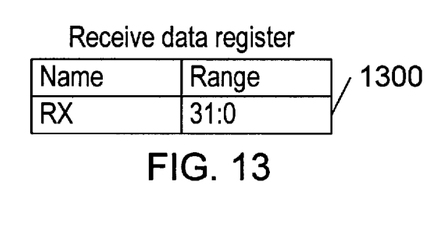
FIG. 13 is a table of a receive data register as visible by a CPU.

FIG. 13 is a diagram of a receive data register 1300 as visible by CPU 110 for reading data from receive FIFO buffer 126. The register appears as a FIFO to the host. Each time this register is read the pointer for the receive FIFO buffer unit 126 is moved. After a packet reception interrupt, the CPU 110 reads the first word via an access to the receive data register, determines the size of the message, and reads subsequent words of the transfer packet, if any, from the receive data register in accordance with the size information.

Figure 14:
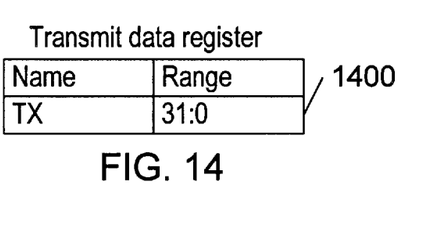
FIG. 14 is a diagram that illustrates a transmit data register as visible by the CPU.

FIG. 14 is a similar diagram that illustrates a transmit data register 1400 as visible by CPU 110. Accesses to the transmit data register 1400 are performed to load a transfer packet into transmit FIFO buffer unit 124. This register also appears as a FIFO to the host. Each time transmit data register 1400 is written, the pointer for the transmit FIFO buffer 124 is moved. A formatted packet is loaded into the transmit FIFO buffer 124 by writing the first word of the packet into the transmit data register 1400, followed by additional words if any in succession. In one embodiment, transmit data register 1400 may not be written while a packet transmission is pending.

Figure 15:
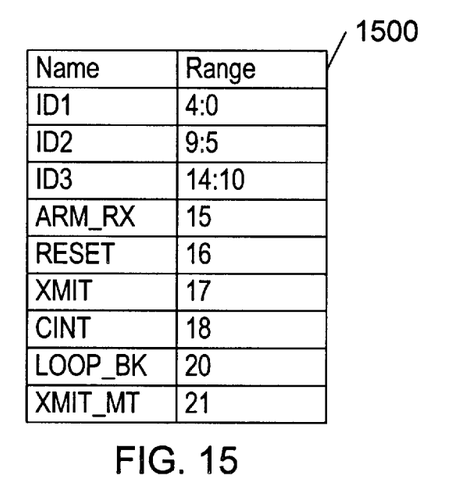
FIG. 15 is a diagram depicting internal fields within a write control register.

FIG. 15 is a diagram depicting internal fields within a write control register 1500. Write control register 1500, along with a read control register as described below, are contained within the control registers unit 128 as illustrated in FIG. 2. A set of ID fields ID1–ID3 are provided to program the ID values for particular interprocessor communications interface 20. A match in any of the three ID fields to the target field of a particular packet being conveyed upon interprocessor communications bus 18 causes that interprocessor communications interface 20 to operate as a receiver. In one embodiment, data within these locations are not reset by hardware. After power on reset, the values are undefined. CPU 110 is configured to store the ID values upon system initialization. It is noted that the same ID value may be stored within the ID fields of more than one interprocessor communications interface 20. This allows information to be conveyed to more than one interprocessor communications interface 20 at the same time in a broadcast fashion.

An "arm reception" bit RX is provided to enable the interprocessor communications interface 20 to snoop transfer packets and begin to receive messages. This bit is disabled by either hard reset or program reset.

A program "reset" signal is provided to provide a hardware reset of the interprocessor communications interface 20. This bit is not latched, but is a fully decodable combinational signal that asynchronously conditions the register fields of interprocessor communications interface 20 to a known state as indicated for each register.

A transmit packet control bit XMIT is written by the host CPU 110 after the transmit FIFO buffer unit 124 has been loaded with a transfer packet or packets for transmission, as discussed above. This bit is cleared by the execution of the request. In one embodiment, if the transfer packet is undeliverable after three attempts, the host must reset the interprocessor communications interface 20 to cancel the transmission, making sure that the receive logic is first turned off and that the receive FIFO buffer unit 126 is checked for unread packets. The transmit FIFO buffer unit 124 may not be written until the status indicated by the packet associated with the last transmitted packet have been sent.

The "clear interrupt" bit CINT is provided to reduce the interrupt count. Each time this bit is written, the interrupt count is reduced by one. If there is one pending interrupt, then this will result in the removal of the physical interrupt signal RINT from the host CPU 110. Multiple interrupts may be cleared by successive writes having this bit set to a logic high value. Writing this bit to a logic low value will not affect its condition. The interrupt should be cleared before a packet is removed from the receive FIFO buffer unit 126 to prevent a new packet from being loaded and the interrupt count from overflowing. While the interrupt count is not "00" the level type interrupt signal RINT is sent to the CPU 110.

A "transmit packet" bit LOOP BK enables the receive FIFO buffer unit 126 to receive a transfer packet that is being sent by the same interprocessor communications interface 20 that is part of. In this manner, it becomes possible for an interprocessor communications interface 20 to send a transfer packet to itself. This feature is intended for POST tests, or may be used as a confirmation that a broadcast was successful. This bit is cleared by either hard or soft reset.

The "transmit packet" bit XMIT MT causes the transmit FIFO buffer 124 to be emptied when the bit is set. This bit may be written to clear the transmit FIFO unit 124 after a time out has occured. This allows other transfer packets to be loaded within the transmit FIFO buffer unit 124.

Figure 16:
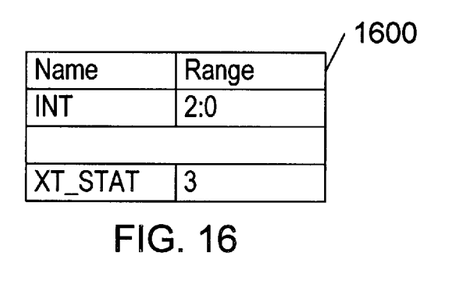
FIG. 16 is a diagram depicting internal fields within a read control register.

Referring finally to FIG. 16, a diagram of fields within a read control register 1600 is shown. An "interrupt status" field INT[2:0] indicates the interrupt status. These bits can indicate four pending interrupts, which corresponds to a maximum packet count of four packets that may be contained within receive FIFO buffer unit 126. The interrupt count may be decremented by writing to the write control register bit CINT in the manner as described above.

A "transmit status" bit XT STAT is set when a transmission is pending. It must be cleared before new data is stored within the transmit FIFO buffer 124 to thus prevent the FIFO's pointers from being corrupted.

As stated previously, a transmission time-out occurs if a transfer packet is undeliverable after three attempts. Occurrence of a transmission time-out causes an interrupt to be generated to notify the host CPU 110 of the transmission failure. This type of interrupt is identified by reading control register 1500, and is cleared automatically when control register 1500 is read. If a transmission time-out occurs, the transmit FIFO buffer unit 124 still contains the packet, and thus the host CPU 110 has the option of writing the control register again with a transmit command to attempt the transmission again. If the host CPU 110 instead desires to transmit another transfer packet, it may clear the contents of the transmit FIFO buffer unit 124 and reload the transmit FIFO buffer 124 with the new transfer packet.

From the above description, it is noted that the CPU 110 will arm the reception mechanism through its address space. The CPU 110 receives interrupt signal RINT when a complete packet has been received by receive FIFO buffer unit 126, and clears the interrupt by writing to the control register 1500. The CPU 110 then reads data within the receive FIFO buffer unit 126 by accessing the receive data register 1300, parses the header byte, and pops the correct number of words. If there are two packets in the receive FIFO buffer unit 126, the interrupt signal RINT remains asserted after the CPU 110 writes to the control register 1500. When the CPU 110 exits its interrupt service routine, it will re-enter the service routine in response to the continued interrupt. It is noted that CPU 110 could check for the presence of another packet within receive FIFO buffer unit 126 before exiting its interrupt service routine.

A multiprocessing system employing the interprocessor communications interfaces and data transfer protocols as described above advantageously facilitates the expedient and efficient exchange of information between processing elements. Overall pin count requirements may be reduced, thereby reducing cost. Extensive host intervention is not required to set up the receiving device and to effectuate the actual transmission and reception of data and other command information. Deleterious effects upon system bus bandwidth (e.g., bandwidth of local bus 108 and bandwidth of memory bus 16) as a result of interprocessor communications may further be reduced. In one embodiment, transactions upon local bus 108 and upon the memory bus 16 may occur at the same time the interprocessor communications interface 20 is armed for transmission, or at the same time interprocessor communications interface 20 is receiving a transfer packet from another interprocessor communications interface.

It is noted that while in the embodiment described above an interrupt RINT is generated when a transfer packet is received by receive FIFO buffer unit 126 to prompt processing subsystem 12 to read the transfer packet therefrom, processing subsystem 12 could be alternatively configured to periodically poll a status register within control register 128 to determine whether a transfer packet has been received by receive FIFO buffer unit 126. Additionally, it is noted that in alternative configurations other interface signals may be provided between interprocessor communications interface 20 and CPU local bus 108, and between interprocessor communications interface 20 and interprocessor communications bus 18.

Numerous variations and modifications will become apparent to those skilled in the art once the above disclosure is fully appreciated. For example, it is understood that the size of a transfer packet may deviate from those described above. Similarly, the size and target fields may be of greater or lesser bit widths.

In addition, it is noted that each of the processing subsystems within the multiprocessing system 10 of FIG. 1 may be implemented in a variety of alternative configurations. It is intended that the following claims be interpreted to embrace all such variations and modifications.

What is claimed is:

1. A processing system which comprises:

a first processing subsystem configured to perform a first portion of a task;

a second processing subsystem configured to perform a second portion of the task;

an interprocessor communications subsystem coupled between the first and second processing subsystems to transport information in the form of transfer packets, wherein the transfer packets comprise a target field, a size field, and a data field, and wherein the interprocessor communications subsystem includes:

an interprocessor communications bus;

a first interface coupled between the interprocessor communications bus and the first processing subsystem;

a second interface coupled between the interprocessor communications bus and the second processing subsystem, wherein both first and second interfaces are each configured to send and receive transfer packets, wherein each interface comprises:

a transmit buffer coupled to receive transfer packets from a processing subsystem for transmission on the interprocessor communications bus;

a receive buffer coupled to receive transfer packets from the interprocessor communications bus;

a control unit coupled to a respective processing subsystem, the transmit buffer, the receive buffer, and the interprocessor communications bus, and configured to orchestrate receipt and transmission of transfer packets between the respective processing subsystem and the interprocessor communications bus;

wherein when the control unit does not have bus ownership, the control unit is configured to monitor transfer packets received on the interprocessor communications bus, wherein the control unit is configured to determine if the target field of received transfer packets corresponds to a predetermined interface address, wherein if the target field of received transfer packets corresponds to the predetermined address, the control unit is configured to compare the size field to available receive buffer space to determine if sufficient space exists in the receive buffer for storing the received transfer packets.

2. The processing system of claim 1, wherein the control unit is further configured to assert the bus release signal before the end of the transfer packet if insufficient receive buffer space is determined to exist.

3. The processing system of claim 2, wherein when the transmit buffer contains a transfer packet the control unit is configured to assert a bus ownership request signal until a bus ownership grant signal is asserted, wherein after the bus ownership grant signal is asserted, the control unit is configured to monitor a bus release signal while the transfer packet from the transmit buffer is transmitted, wherein if the bus release signal is asserted before the end of the transfer packet, the control unit is configured to halt transmission of the transfer packet and to attempt later re-transmission of the transfer packet.

4. The processing system of claim 3, wherein if the bus release signal is not asserted before the end of the transfer packet, the control unit is configured to assert the bus release signal at the end of the transfer packet.

5. The processing system of claim 4, wherein the control unit is further configured to assert a framing signal prior to initiating transmission of a transfer packet from the transmit buffer.

6. The processing system of claim 4, wherein the control unit is further configured to synchronize transmission of a transfer packet with an interprocessor communications bus clock signal.

7. The processing system of claim 6, wherein the interprocessor communications bus clock signal has a frequency unequal to a clock signal used by the first and second processing subsystems.

8. The processing system of claim 6, wherein the control unit causes said transfer packet to be conveyed upon said interprocessor communications bus asynchronous to operations of said first processing subsystem.

9. The processing system of claim 4, wherein the control unit is further configured to assert a processing subsystem interrupt to notify the respective processing subsystem of a received transfer packet.

10. The processing system of claim 4, wherein a maximum transfer packet size is four words, and wherein the size field consists of two bits.

11. The processing system of claim 4, wherein a maximum number of processing subsystems is 64, and wherein the target field consists of six bits.

12. The processing system of claim 4, wherein the control unit is further configured to assert a processing subsystem interrupt if the control unit halts transmission of any particular transfer packet in the transmit buffer three times.

13. The processing system of claim 4, wherein the interprocessor communications subsystem further comprises a bus arbiter coupled to receive respective bus request signals from each interface, coupled to the interprocessor communications bus to monitor the bus release signal, and coupled to provide respective bus ownership grant signals to each interface, wherein the bus arbiter is configured to assert a bus ownership grant signal in response to the bus request signals and the bus release signal.

14. The processing system of claim 13, wherein the bus arbiter is configured to perform a round-robin algorithm to determine which interface receives the asserted bus ownership grant signal.

15. The processing system of claim 4, further comprising:

a system memory; and a memory bus coupled between the system memory and the processing subsystems, wherein the memory bus is independent of the interprocessor communications bus.

16. A method for supporting interprocessor communication in a multiprocessor system having a memory bus coupled between each of the processors and a system memory, and having an interprocessor communications subsystem which operates independently of the memory bus, wherein the method comprises:

a first processor writing a transfer packet to a transmit buffer in a first processor interface in the interprocessor communications subsystem, wherein the transfer packet includes a control portion having a target field and a size field;

the first processor interface asserting a bus request signal coupled to a bus arbiter;

the bus arbiter asserting a bus grant signal coupled to the first processor interface;

the first processor interface transmitting the transfer packet on an interprocessor communications bus at a rate of one portion per each bus cycle, wherein a first portion transmitted is the control portion;

the first processor interface halting transmission of the transfer packet if a bus release signal is asserted before a last portion of the transfer packet is transmitted;

a second processor interface monitoring the interprocessor communications bus and receiving the control portion of the transfer packet;

the second processor interface comparing the target field to a predetermined address;

the second processor interface comparing the size field with available receive buffer space if the target field matches the predetermined address;

the second processor interface asserting the bus release signal if the target field matches the predetermined address and insufficient receive buffer space exists;

the second processor interface receiving and storing the transfer packet in a receive buffer only if the target field matches the predetermined address and sufficient receive buffer space exists.

17. The method of claim 16, further comprising:

the second processor interface asserting an interrupt signal to a second processor after storing the transfer packet in the receive buffer;

the second processor reading the transfer packet from the receive buffer.

18. The method of claim 16, further comprising:

the first processor interface asserting the bus request signal after halting transmission of a transfer packet due to assertion of the bus release signal before the last portion of the transfer packet is transmitted;

the bus arbiter asserting the bus grant signal;

the first processor interface re-transmitting the transfer packet on the interprocessor communications bus;

the first processor interface halting re-transmission of the transfer packet if the bus release signal is asserted before the last portion of the transfer packet is transmitted.

19. The method of claim 18, further comprising:

the first processor interface asserting the bus request signal after halting re-transmission of a transfer packet due to assertion of the bus release signal before the last portion of the transfer packet is transmitted;

the bus arbiter asserting the bus grant signal;

the first processor interface again retransmitting the transfer packet on the interprocessor communications bus;

the first processor interface again halting re-transmission of the transfer packet if the bus release signal is asserted before the last portion of the transfer packet is transmitted;

the first processor interface asserting an interrupt signal to the first processor after again halting re-transmission due to assertion of the bus release signal.

20. The method of claim 16, wherein the control portion of the transfer packet consists of one byte.

21. The method of claim 16, further comprising the first processor interface asserting a framing signal on the interprocessor communications bus to indicate transmission of the first portion of a transfer packet, wherein the first processor interface asserts the framing signal after the bus grant signal is asserted.

22. The method of claim 16, further comprising the first processor interface asserting the bus release signal upon transmission of the last portion of the transfer packet.

* * * * *